US006762936B1

(12) United States Patent  
Chang

(10) Patent No.: US 6,762,936 B1  
(45) Date of Patent: Jul. 13, 2004

(54) SECTIONAL EXTERNAL ENCLOSURE

(76) Inventor: Cheng Chun Chang, 11F-2, No. 11, Lane 202, Jing-Shing Road, Wen-Shan D1, Taipei (TW)

( * ) Notice: Subject to any disclaimer, the term of this patent is extended or adjusted under 35 U.S.C. 154(b) by 20 days.

(21) Appl. No.: 10/422,479

(22) Filed: Apr. 24, 2003

(30) Foreign Application Priority Data

Jan. 29, 2003 (TW) ...................................... 92201684 U

(51) Int. Cl.⁷ ................................................ H05K 7/10
(52) U.S. Cl. ...................... 361/687; 312/333; 364/708; 439/377
(58) Field of Search ................................ 361/679–687, 361/724–727; 312/332.1, 333; 70/58, 59; 364/708; 360/97.01, 137; 439/76, 377, 928

(56) References Cited

U.S. PATENT DOCUMENTS

| | | | | |
|---|---|---|---|---|
| 5,187,643 A | * | 2/1993 | I-Shou ........................ | 361/685 |
| 5,400,216 A | * | 3/1995 | Tsai ............................ | 361/684 |
| 5,406,450 A | * | 4/1995 | Shieh ......................... | 361/686 |
| 5,600,538 A | * | 2/1997 | Xanthopoulos ............. | 361/683 |

* cited by examiner

*Primary Examiner*—Hung Van Duong
(74) *Attorney, Agent, or Firm*—Quintero Law Office

(57) ABSTRACT

The present invention discloses a sectional external enclosure, comprising: a bottom plate having a bottom hole at each of its four corners, at least one positioning hole on each of its both sides, and a connecting hole/groove corresponding to a screw hole at the bottom of its periphery; two corresponding side panels, each having at least one positioning latch extended from its bottom and being inserted in the positioning hole; a fixing hole disposed on each end and passing through the bottom hole with a connecting member and secured to the fixing hole; an embedding groove disposed on the inner end of the rear side of the two side panels; a rear panel, vertically disposed at the rear end of the two side panels, and a guide latch protruded from both sides of the rear panel being inserted into the embedding groove for the positioning, and a plurality of through holes on the panel corresponsive to the surface of the signal connecting device for accommodating and positioning the rear panel to constitute the signal connection with the computer; a top panel having a top hole at each of its four corners and a connecting member passing through the top hole to fix the top panel onto the fixing hole such that the panels being enclosed into an external enclosure.

11 Claims, 3 Drawing Sheets

SECTIONAL EXTERNAL ENCLOSURE

BACKGROUND OF THE INVENTION

1. Field of the Invention

The present invention relates to an external enclosure, more particularly to a sectional external enclosure for accommodating computer peripheral devices.

2. Description of the Related Art

Computer is common to our life, and brings us much convenience. Any slow manual operation such as computation, file management, data storage, and data search can improve their efficiency with computer applications. Therefore, the blooming of computer is basically another wave of "Industrial Revolution".

As the computer application becomes more popular, the communications, and multimedia applications of desktop computers and compact notebook computers utilize peripheral devices such as the 5.25-inch CD ROM, DVD ROM, CD-R, and CD-RW drives as well as mobile racks and interfaces such as the USB and IEEE 1394 (Fire Wire) interfaces for fast transmissions. Therefore, it is no longer a dream to use external enclosures for the connection of computers and peripheral devices.

Traditional computer external enclosures mainly use two sidewalls of an upper casing and a lower casing to respectively mount onto a fixed board, and a peripheral device such as an optical disk drive of the 5.25-inch specification is fixed between the two fixed boards by screws. The computer external enclosure of this type has been sold for years and that is the only choice. However, there is a shortcoming that the way of adjusting the position and securing the casings, fixed boards, and peripheral devices always troubles the computer users. Therefore, the inventor of the present invention has provided a solution as disclosed in the Taiwanese Utility Model Patent No. 178536 (foreign counterpart, Chinese Utility Model Patent No. 01200391.3). In view of the current existing computer external enclosures, it is difficult to break through its style, and the way of adjusting and positioning the fixed boards and peripheral devices for their combination needs to be improved.

SUMMARY OF THE INVENTION

The primary objective of the present invention is to provide a sectional external enclosure which comprises a bottom panel, two side panels, a rear panel, and a top panel; wherein the bottom and top panels are coupled with the four corners of the two side panels, and the rear end of the two side panels has an embedding groove for embedding and securing a rear panel, and finally a peripheral device is secured on the bottom panel to complete the assembling of the section external enclosure in accordance with the present invention. Such arrangement makes the assembling procedure very quick and convenient without any trouble of adjusting and positioning the fixed board.

The secondary objective of the present invention is to provide a sectional external enclosure, of which the two side panels and the rear panel have stylish design on the external surface, such as the design of horizontal decorative channels to enhance the artistic look of the external enclosure, and the modular design for the components of this invention can greatly reduce the volume of packing material and the assembling procedure for manufacturers.

A further objective of the present invention is to provide a sectional external enclosure, of which the two side panels has a pair of embedding grooves at its front end for fixing the two latches of a front panel to seal the opening end of the external enclosure.

Another further objective of the present invention is to provide a sectional external enclosure, of which the bottom panel is preferably made of metal boards and each of the rest of panels has a thin metal sheet attached on its inner wall to provide the functions of dissipating heat and preventing electromagnetic interference in order to comply with the requirements of safety regulations.

In view of the above description, the present inventor herein with many years of practical experience in the design, development, manufacturing and marketing of computer peripherals enhances the design of the external enclosure by performing a series of researches and developments and finally succeeds to invent the sectional external enclosure of the present invention.

BRIEF DESCRIPTION OF THE DRAWINGS

Other features and advantages of the present invention will become apparent in the following detailed description of the preferred embodiments with reference to the accompanying drawings, in which.

DETAILED DESCRIPTION OF THE PREFERRED EMBODIMENTS

Figure 1:
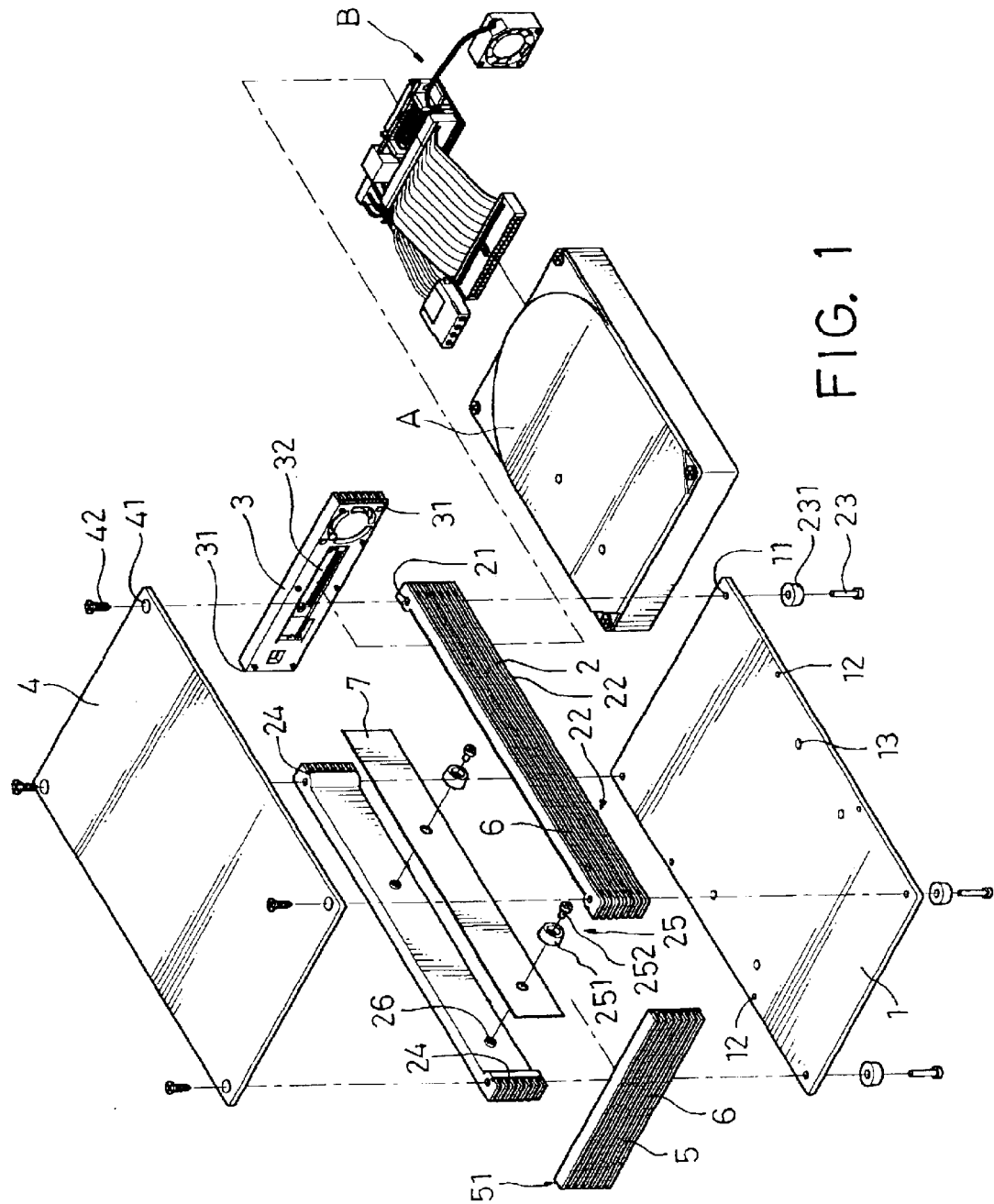
FIG. 1 is a perspective diagram of the external enclosure of the present invention.
Figure 2:
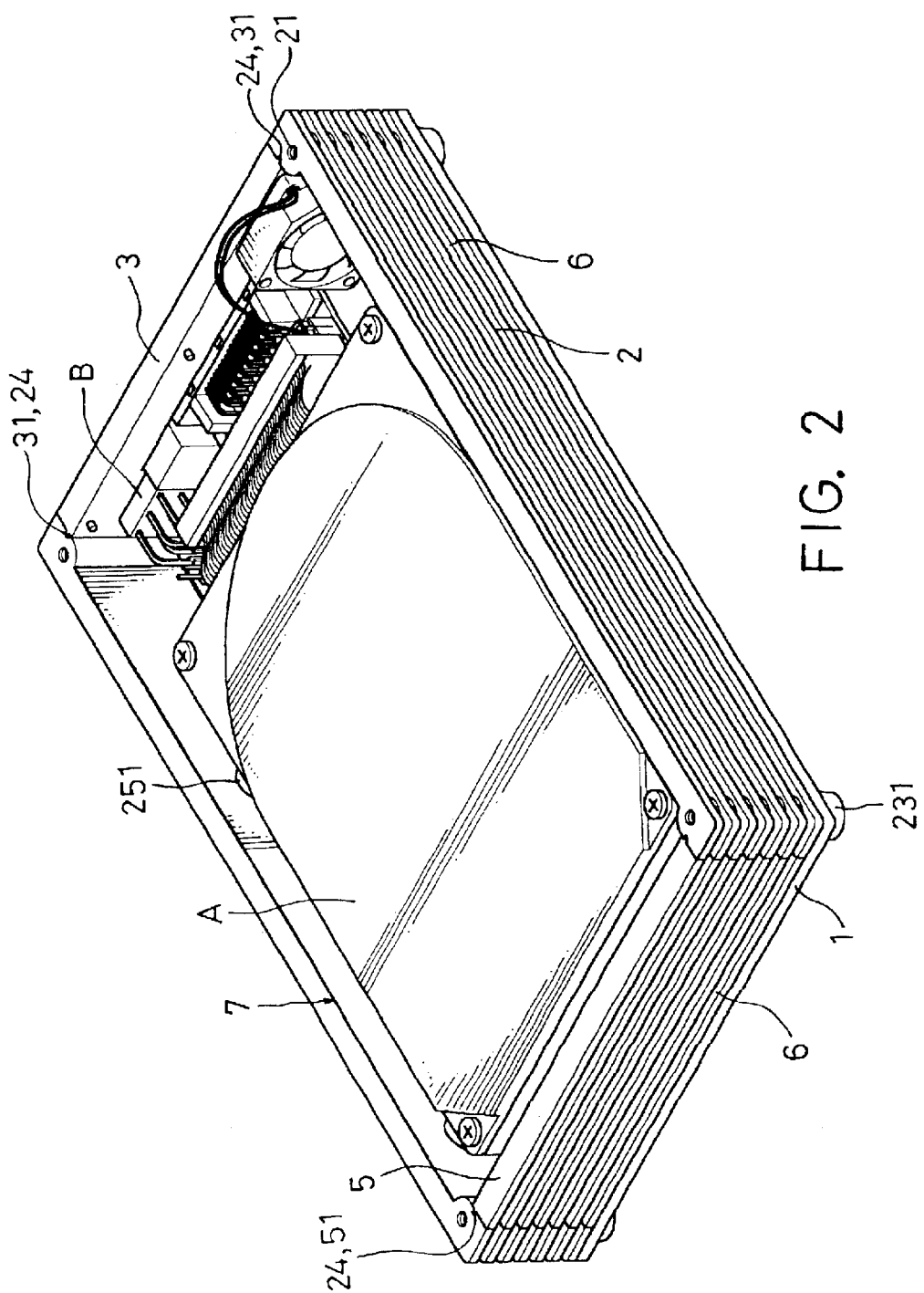
FIG. 2 is a perspective diagram of the assembled structure without mounting the top panel according to the present invention.
Figure 3:
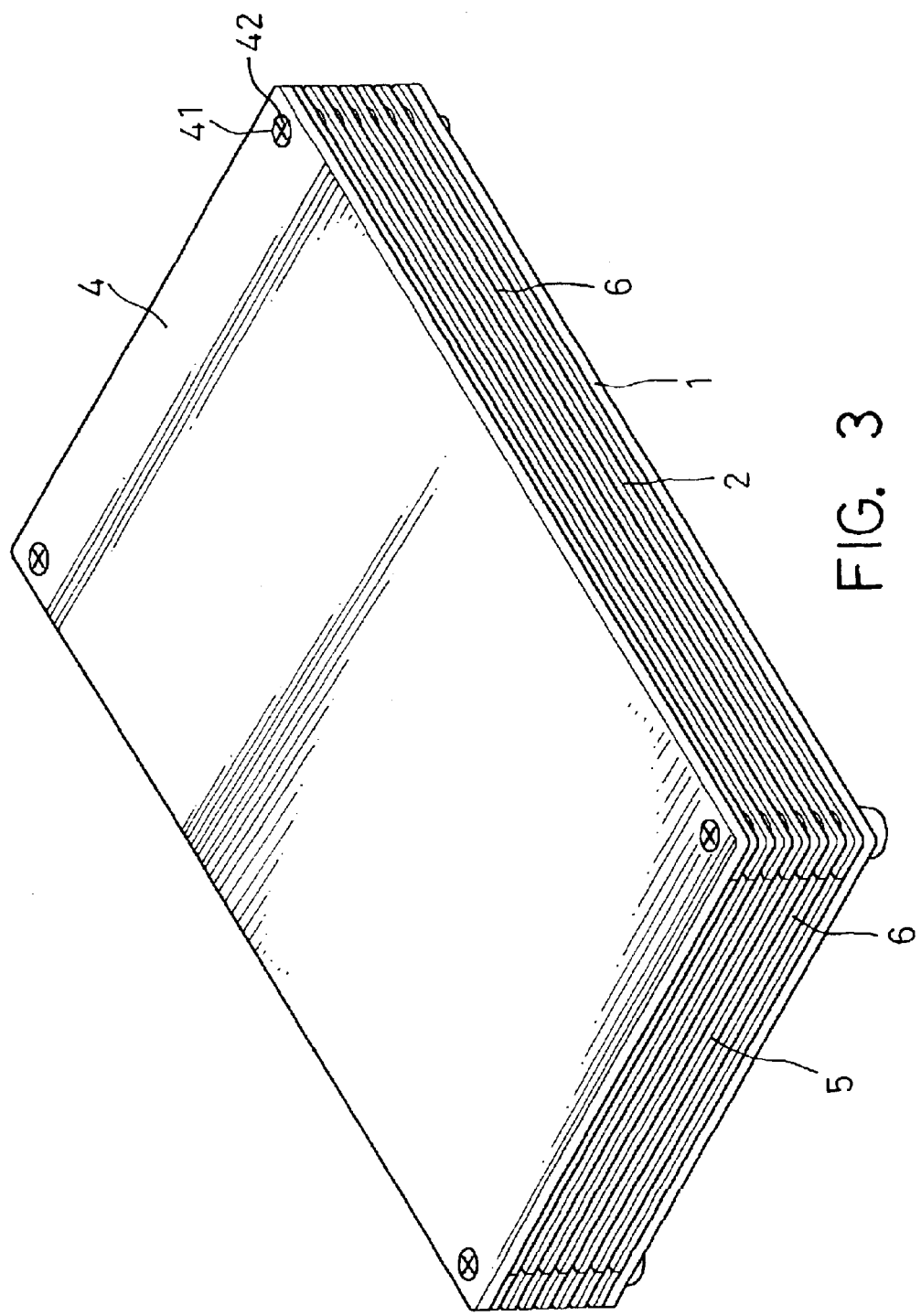
FIG. 3 is a perspective diagram of the assembled structure of the present invention.

Refer to FIGS. 1 to 3. In the figures, the external enclosure according to the present invention basically has a bottom panel 1, two side panels 2, a rear panel 3, and a top panel 4.

The bottom panel 1 is a flat board, preferably made of metals such as aluminum for providing the functions of dissipating heat and preventing electromagnetic interference (EMI). Each corner of the bottom panel 1 has a bottom hole 11, and each of the two sides corresponsive to the bottom of the side panel 2 has at least one positioning hole 12 corresponding to a positioning latch 22 for the preliminary positioning. In addition, each of the both sides of the bottom panel 1 corresponding to a peripheral device has a connecting hole/groove such as four connecting holes or a pair of connecting grooves (as shown in the figure) disposed at the position corresponding to the connecting hole on the bottom of the hard disk drive for letting the screws pass through and fix the peripheral device A onto the bottom panel 1.

Two side panels 2 are disposed respectively on both sides of the bottom panel 1, and a fixing hole 21 is disposed at the position corresponding to the bottom holes 11 at the corners on both ends of the bottom panel 1 and a positioning latch 22 is protruded from the bottom edge of the corresponding positioning holes 12. During the assembling, the positioning latch 22 is inserted into the positioning hole 12 first, and then a prior-art connecting member 21 such as a screw or a latch passes through the bottom hole 11 and is fixed to the fixing hole 21 such that the two side panels 2 are fixed onto the both sides of the bottom panel 1. The connecting member 23 can connect to a footer 231 first and then fixed into the fixing hole 21 to attain the anti-slippery and heat dissipation effects. Furthermore, the front end and the rear end of the two side panels 2 respectively have an embedding groove 24 for engaging a front panel. In addition, at least one damper 25 is disposed between the peripheral device and each side panel 2 as shown in the figure to provide the shock-resisting effect. A damper pad 251 connected to a screw 252 is secured into a pad hole 26 on the inner wall of each side panel 2 such that the damper pad 251 is in contact with the peripheral device A.

The rear panel 3 uses the guide latch 31 protruded on both sides to engage into the embedding groove 24 respectively on the two side panels 2 for the fixing. Since the rear panel 3 is a channel for connecting to the computer by providing a plurality of slots 32 on its surface to fix a peripheral device B having a signal connected to a peripheral A such as a connector, a switch, a power socket to the computer. Such arrangement provides the effect for connecting external devices.

The top panel 4 is a board preferably an aluminum board for the implementation. A top hole 41 is disposed at a position corresponding to each fixing hole 21 of the two side panels corresponsive to the top panel 4, and a prior-art connecting member 42 such as the aforementioned screw or latch passes through the top hole 41 to fix the; top panel 4 to the fixing hole 21 such that the top panel 4 seals the top of the external enclosure.

Therefore, after the aforementioned components are assembled, the front side of the external enclosure is an opening for accommodating the reciprocal movements and plugging and unplugging of the tray or cartridge of a peripheral device such as an optical disk drive, a CD ROM drive or a mobile rack. However, if the peripheral device A is a hard disk drive, the opening of the external enclosure is coupled to a front panel 5 for sealing the opening of the external enclosure. The embedding grooves 24 on the two side panels 5 corresponsive to the front panel 5 each has a protruded latch 51 for the engagement through the embedment.

To improve the stylish design of the external enclosure of the present invention, a decorative channels 6 is disposed horizontally on the external surface of each of the side panel 2, rear panel 3, and front panel 5, and the decorative groove 6 on the front panel is a penetrating groove, so that the air can be introduced into the external enclosure for heat dissipation. Furthermore, a thin metal plate 7 is attached on the inner wall of each of the side panel 2, rear panel 3, and front panel 5 for isolating the leakage of electromagnetic wave that can fully comply with the requirements of safety regulations.

While the present invention has been described by the most practical and preferred embodiments, it is understood that this invention is not limited to the disclosed embodiments but is intended to cover various arrangements included within the spirit and scope of the broadest interpretations and equivalent arrangements.

What is claimed is:

1. A sectional external enclosure, comprising:
   a bottom panel, having a bottom hole disposed at each of its four corners, at least one positioning hole each being disposed at both sides of said bottom panel, and a connecting hole/groove respectively corresponding to a screw hole at the bottom of a peripheral device;
   two corresponding side panels, each having at least one positioning latch protruded from its bottom for being secured into said positioning hole, a fixing hole at each end, and using a connecting member to pass through said bottom hole for being fixed to said fixing hole, and an embedding groove disposed at the inner rear end of said two side panels;
   a rear panel, being vertically disposed at the rear end of said two side panels, having a guiding latch protruded from both sides of said rear panel for inserting into said embedding groove for positioning, and a plurality of through holes disposed on the surface corresponding to a signal connecting device;
   a top panel, having a top hole at each of its four corners, and using a connecting member to pass through the top hole to fix into said fixing hole, such that the panels defining an external enclosure.

2. The sectional external enclosure of claim 1, wherein said bottom and top panels are made of a metal board.

3. The sectional external enclosure of claim 1, wherein said connecting member is a screw.

4. The sectional external enclosure of claim 1, wherein said bottom panel has a footer at each of its four corners, being coupled to said bottom hole by said connecting member for fixing.

5. The sectional external enclosure of claim 1, wherein said side panels and peripheral device have at least one damper in between.

6. The sectional external enclosure of claim 1, further comprising a front panel and an embedded groove disposed at the front end of said two side panels for receiving a latch protruded from both sides of said front panel to define a sealed enclosure of the external enclosure.

7. The sectional external enclosure of claim 1, wherein said two side panels and a rear panel have decorative channels on each of their surfaces.

8. The sectional external enclosure of claim 6, wherein said side panels rear panel, and front panel have a thin metal sheet on each of their inner walls.

9. The sectional external enclosure of claim 5, wherein said damper strings up a damper pad with a screw to be secured into a pad hole at the inner wall of said side panel.

10. The sectional external enclosure of claim 6, wherein said front panel has decorative channels on its surface.

11. The sectional external enclosure of claim 10, wherein said decorative channels are penetrating on the front panel.

* * * * *